Patented May 27, 1952

2,597,988

UNITED STATES PATENT OFFICE 2,597,988

PRODUCTION OF THIOCARBAMYL THIAZYL MONOSULFIDES

Albert F. Hardman, Akron, Ohio, assignor to Wingfoot Corporation, Akron, Ohio, a corporation of Delaware No Drawing. Application May 6, 1950,
Serial No. 160,591

6 Claims. (Cl. 260—306.6)

This invention relates to a new method for the preparation of thiocarbamyl thiazyl monosulfides, a class of compounds useful as accelerators in the vulcanization of rubber.

The thiocarbamyl thiazyl monosulfides have been prepared in the past by reacting, for example, a 2-chloro benzothiazole with an alkali metal salt of a dialkyl dithiocarbamate. These reactions were slow and had to be carried out under pressure since the chlorine of the 2-chloro benzothiazole is not very labile.

It is an object of this invention to provide a method for the preparation of thiocarbamyl thiazyl monosulfides which may be carried out atmospheric pressure. Another object is to provide a method for the preparation of these compounds requiring a relatively short reaction time. Still another object is to provide a method for preparing thiocarbamyl thiazyl monosulfides in high yields and in a high state of purity. Another object is to provide an efficient, inexpensive method for the production of thiocarbamyl thiazyl monosulfides. Further objects will appear as the description proceeds.

According to the practice of this invention, a dithiazyl disulfide is reacted with a water-soluble metal salt of a dithiocarbamic acid in the presence of an alkali metal cyanide to form the thiocarbamyl thiazyl monosulfide, together with an alkali metal thiocyanate and an alkali metal salt of a 2-mercaptothiazole. The reaction is thought to take place according to the following reaction:

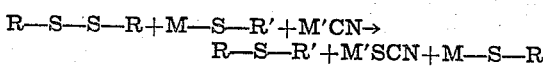

where R represents a thiazyl radical, R' represents a thiocarbamyl radical, M' represents an alkali metal radical and M represents a metal radical whose dithiocarbamic acid salt is water-soluble.

The method of preparation to which this invention relates embraces the reaction of a member of the class of dithiazyl disulfides with a member of the class of alkali metal salts of a dithiocarbamic acid. Examples of the dithiazyl compounds which may be used in the practice of this invention are dibenzothiazyl disulfide, the substituted benzothiazyls such as 6-nitrobenzothiazyl disulfide, 5-chlorobenzothiazyl disulfide, and 6-chlorobenzothiazyl disulfide, the alkyl thiazyls such as 4,5-dimethyl thiazyl disulfide and 4-ethyl thiazyl disulfide, and naphthothiazyl disulfide.

Examples of the water-soluble metal salts of dithiocarbamic acids are the dialkyl compounds such as sodium, calcium, ammonium or potassium dimethyl dithiocarbamates, sodium, potassium, calcium, or ammonium diethyl dithiocarbamates, the aromatic compounds such as sodium, potassium, calcium or ammonium diphenyl dithiocarbamates, the aralkyl compounds such as sodium, calcium, ammonium or potassium dibenzyl dithiocarbamates, the cycloaliphatic compounds such as sodium, calcium, ammonium or potassium dicyclohexyl dithiocarbamates, and the heterocyclic compounds such as sodium, potassium, calcium, or ammonium piperidyl dithiocarbamates, and sodium, potassium, calcium, or ammonium morpholyl dithiocarbamates. Any water-soluble metal salt may be used. Examples of the metals whose dithiocarbamic acid salts are water-soluble are the alkaline earth metals such as calcium, strontium, and barium, the alkali metals such as sodium, potassium, lithium, rubidium, and cesium, ammonium, and substituted ammonia or amines.

The cyanide used in the reaction may be any alkali metal cyanide, such as sodium or potassium. Sodium cyanide is prefered since it is the cheapest material available commercially.

For best results the reaction should take place in solution. The monosulfide formed by the reaction is relatively insoluble and, once formed, crystallizes out of solution. The alkali metal salt of a 2-mercapto thiazole, which is the other produce of the reaction, remains in solution. After the monosulfide crystals have been separated from solution, this salt may also be recovered by methods well known in the art such as by precipitation of the mercapto thiazole with a dilute mineral acid. The reaction has been found to take place in water, organic solvents or a mixture of organic solvent and water. Preferred practice provides a reacting medium which will dissolve but not chemically affect the reactants. In this manner a more intimate mixture of the reacting materials is obtained with resultant higher conversions and higher yields. Any inert solvent may be used, by which term is meant any solvent for the reacting materials which will not enter into or chemically affect the reaction. Examples of suitable solvents are water, methyl alcohol, ethyl alcohol, isopropyl alcohol, ether, dioxane, acetone, and methyl ethyl ketone.

The practice of this invention is further illustrated by the following examples:

*Example 1*

One hundred cubic centimeters of 2 N sodium dimethyl dithiocarbamate in water were mixed with 68 grams of dibenzothiazyl disulfide in 150 cubic centimeters of acetone. To this slurry 27 cubic centimeters of a 33⅓% sodium cyanide solution in water were added. The mixture became warm. The disulfide dissolved and crystals of dimethyl - thiocarbamyl - benzothiazyl monosulfide quickly formed. The crystals were removed from solution washed with acetone and with water. The yield was 40 grams. The crude product melted at 114–115° C.

*Example 2*

Morpholine (35 grams) was dissolved with 20 grams of sodium hydroxide in 100 cubic centimeters of water. Thirty-one grams of CS₂ were slowly added with stirring and cooling. Benzothiazyl disulfide (150 grams) was added with 300 cubic centimeters of acetone and 60 cubic centimeters of 33⅓% solution of sodium cyanide in water. Crystals immediately formed which upon separation and drying melted at about 152° C. The yield was 74 grams. An analysis showed a sulfur content of 32.36% and 32.46% and a nitrogen content of 9.36% and 9.39%. Calculated sulfur is 32.40% and nitrogen 9.46%. The formula is therefore assumed to be

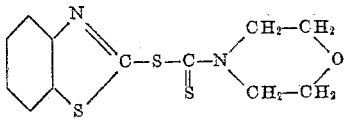

*Example 3*

Cyanoethyl-cyclohexylamine (61 grams) was dissolved in 100 cubic centimeters of water. Sodium hydroxide (20 grams) and CS₂ (31 grams) were stirred into the solution. Benzothiazyl disulfide (150 grams) was then added along with 300 cubic centimeters of acetone and 60 cubic centimeters of a 33⅓% solution of sodium cyanide in water. A reaction occurred as in Example 2, a yield of 80 grams of crystals being obtained. A recrystallized sample melted at 172° C. Analysis showed a sulfur content of 26.55% and 26.73% and a nitrogen content of 11.10% and 11.28%. Calculated sulfur is 26.60% and 11.60%. The formula is therefore assumed to be

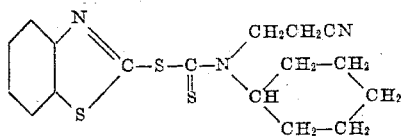

*Example 4*

Alpha pipecoline (40 grams) was dissolved in 100 cubic centimeters of water. Sodium hydroxide (20 grams) and CS₂ (31 grams) were added. The resulting solution was then mixed with 150 grams of benzothiazyl disulfide in 300 cubic centimeters of acetone and treated with 55 cubic centimeters of a 33⅓% solution of sodium cyanide in water. Crystals formed which were removed from solution and dried. The yield was 83 grams of crude product melting at 143–145° C. An analysis of a recrystallized sample showed a sulfur content of 31.64% and 31.67% and a nitrogen content of 8.71% and 8.55%. Calculated sulfur is 31.20% and nitrogen 9.10%. The formula is therefore assumed to be

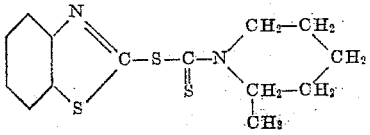

It will be noted from the above examples that for the purposes of this invention the alkali metal dithiocarbamate may be prepared separately as shown in Example 1 or in situ as shown in Examples 2, 3 and 4.

Examples of other thiocarbamyl thiazyl monosulfides which may be made according to the practice of this invention are B-cyanoethyl-ethyl-thiocarbamyl - benzothiazyl - monosulfide, tetrahydrofurfuryl - cyclohexyl - thiocarbamyl-benzothiazyl-monosulfide, allyl - ethyl - thiocarbamyl-benzothiazyl - monosulfide, N-cyclotetramethylene - thiocarbamyl - benzothiazyl - monosulfide, phenyl - methyl - thiocarbamyl - benzothiazyl-monosulfide, diphenyl - thiocarbamyl - benzothiazyl - monosulfide, diethyl - thiocarbamyl-6-nitrobenzothiazyl-monosulfide, methyl-isopropyl-thiocarbamyl - benzothiazyl - monosulfide, dimethyl - thiocarbamyl - 4,5 - dimethyl - thiazyl-monosulfide, and dimethyl-thiocarbamyl-4-ethyl-thiazyl-monosulfide.

While certain representative embodiments and details have been shown for the purpose of illustrating the invention, it will be readily apparent to those skilled in the art that various changes and modifications may be made therein without departing from the spirit or scope of the invention.

I claim:

1. A method for the preparation of a thiocarbamyl thiazyl monosulfide which comprises reacting a symmetrical dithiazyl disulfide, a water-soluble metal salt of a dithiocarbamic acid, and an alkali metal cyanide and separating the monosulfide from the reaction mixture.

2. A method for the preparation of a thiocarbamyl benzothiazyl monosulfide which comprises reacting dibenzothiazyl disulfide, a water-soluble metal salt of a dialkyl dithiocarbamic acid, and an alkali metal cyanide and separating the monosulfide from the reaction mixture.

3. A method for the preparation of dimethyl-thiocarbamyl benzothiazyl monosulfide which comprises reacting dibenzothiazyl disulfide, sodium dimethyl dithiocarbamate, and an alkali metal cyanide and separating the monosulfide from the reaction mixture.

4. A method for the preparation of diethyl thiocarbamyl benzothiazyl monosulfide which comprises reacting dibenzothiazyl disulfide, sodium diethyl dithiocarbamate, and an alkali metal cyanide and separating the monosulfide from the reaction mixture.

5. A method for the preparation of dimethyl-thiocarbamyl benzothiazyl monosulfide which comprises reacting dibenzothiazyl disulfide, sodium dimethyl dithiocarbamate, and sodium cyanide and separating the monosulfide from the reaction mixture.

6. A method for the preparation of diethyl thiocarbamyl benzothiazyl monosulfide which comprises reacting dibenzothiazyl disulfide, sodium diethyl dithiocarbamate, and sodium cyanide and separating the monosulfide from the reaction mixture.

ALBERT F. HARDMAN.

REFERENCES CITED

The following references are of record in the file of this patent:

UNITED STATES PATENTS

| Number | Name | Date |
| --- | --- | --- |
| 2,064,782 | Cramer | Dec. 15, 1936 |
| 2,510,893 | Kleiman | June 6, 1950 |